US012393135B2

(12) United States Patent
Shirahata et al.

(10) Patent No.: US 12,393,135 B2
(45) Date of Patent: Aug. 19, 2025

(54) IMAGE FORMING APPARATUS

(71) Applicant: CANON KABUSHIKI KAISHA, Tokyo (JP)

(72) Inventors: Norihiro Shirahata, Tokyo (JP); Shuhei Tokiwa, Tokyo (JP); Satoru Motohashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/389,937

(22) Filed: Dec. 20, 2023

(65) Prior Publication Data

US 2024/0219859 A1 Jul. 4, 2024

(30) Foreign Application Priority Data

Dec. 28, 2022 (JP) ................................ 2022-212422

(51) Int. Cl.
*G03G 15/02* (2006.01)

(52) U.S. Cl.
CPC ..... *G03G 15/0266* (2013.01); *G03G 15/0258* (2013.01)

(58) Field of Classification Search
USPC ............................................................ 399/50
See application file for complete search history.

(56) References Cited

U.S. PATENT DOCUMENTS 5,371,578 A * 12/1994 Asano ................ G03G 15/0216 399/175
5,999,773 A * 12/1999 Yasutomi ........... G03G 21/0017 399/148
6,081,679 A * 6/2000 Yamane ............. G03G 21/0064 399/343
9,921,514 B2 3/2018 Ikeda
10,268,135 B2 4/2019 Ikeda
10,558,137 B2 2/2020 Ikeda
11,860,566 B2 1/2024 Kanazawa
2017/0090333 A1 3/2017 Ikeda
2018/0157188 A1 6/2018 Ikeda
2019/0187582 A1 6/2019 Ikeda
2024/0085846 A1 3/2024 Kanazawa

FOREIGN PATENT DOCUMENTS

EP 0563478 A2 * 10/1993
JP 2003-228226 A 8/2003
JP 2003-302816 A 10/2003
JP 2007-093981 A 4/2007
JP 2015-230474 A 12/2015
JP 2017-062372 A 3/2017

* cited by examiner

*Primary Examiner* — Quana Grainger
(74) *Attorney, Agent, or Firm* — Venable LLP

(57) ABSTRACT

Provided is an image forming apparatus that can execute a first operation to move developer from a surface of a charging member to a surface of an image bearing member, and a second operation to supply developer to a cleaning portion, wherein a region of the surface of the image bearing member to which the developer is supplied in the second operation includes a region where a second potential difference is generated, so that an electrostatic force is generated to move the developer, which is charged to the normal charging polarity in the first operation immediately before supplying the developer, from the charging member and the image bearing member.

18 Claims, 8 Drawing Sheets

IMAGE FORMING APPARATUS

BACKGROUND OF THE INVENTION

Field of the Invention

The present invention relates to an image forming apparatus that forms an image on a recording material.

Description of the Related Art

In an image forming apparatus using an electrophotographic system, a toner image (developer image) is formed on an image bearing member, e.g., photosensitive drum, by developing an electrostatic latent image formed on the image bearing member, and the toner image is transferred to a recording material or the like. Toner remaining on the image bearing member after transferring the toner image is removed by a cleaning member such as a cleaning blade, and various maintenance operations are performed to prepare for the next image forming operation (this maintenance operation period will be called "post rotation period").

As an operation that is performed in the post rotation period, Japanese Patent Application Publication No. 2015-230474, for example, discloses a discharging operation of toner (developer) that is called "toner purge". This is an operation to supply the toner to a contact portion between the cleaning member and the image bearing member. Further, Japanese Patent Application Publication No. 2003-302816 discloses a cleaning operation for a charging roller. This is an operation to transfer adhered substances, e.g., developer, attached to the charging roller, and collect the adhered substances using a developing member, a cleaning member, and the like (hereafter called "charging roller cleaning").

SUMMARY OF THE INVENTION

In the case of the above mentioned maintenance operation, such as toner purge and charging roller cleaning, the productivity of image formation of the image forming apparatus is influenced by the time required for the maintenance operation and effectiveness thereof.

It is an object of the present invention to provide a technique to improve the productivity of image formation of an image forming apparatus which executes the maintenance operation in the post rotation period.

To solve the above problem, an image forming apparatus of the present invention includes:

- an image bearing member configured to rotate;
- a charging member configured to contact with the image bearing member and to rotate while forming a charging portion, the charging member charging a surface of the image bearing member at the charging portion;
- a charging voltage applying portion configured to apply charging voltage to the charging member;
- an exposure unit configured to expose the surface of the image bearing member charged by the charging member;
- a developer bearing member configured to bear developer, face the image bearing member at a developing portion, and supply the developer to the surface of the image bearing member;
- a developing voltage applying portion configured to apply developing voltage to the developer bearing member;
- a transfer member configured to transfer the developer, which has been supplied to the surface of the image bearing member at a transfer portion, onto a transferred member;
- a transfer voltage applying portion configured to apply transfer voltage to the transfer member;
- a cleaning member configured to contact the image bearing member at a cleaning portion which is formed on a downstream side of the transfer portion and on an upstream side of the charging portion in a rotating direction of the image bearing member; and
- a control portion configured to control the charging voltage applying portion, the developing voltage applying portion and the transfer voltage applying portion, wherein the control portion can execute
- a first operation to move the developer from a surface of the charging member to the surface of the image bearing member by controlling the charging voltage applying portion, and
- a second operation to supply the developer to the cleaning portion by controlling the charging voltage applying portion, the developing voltage applying portion and the transfer voltage applying portion, wherein in the first operation, between the charging member and the image bearing member, the control portion controls the charging voltage applying portion so as to generate
- a first potential difference that generates an electrostatic force to move developer, which is charged to an opposite polarity to a normal charging polarity of the developer, from the charging member to the image bearing member, and
- a second potential difference that generates an electrostatic force to move developer, which is charged to the normal charging polarity, from the charging member to the image bearing member, wherein in the second operation, the control portion controls the charging voltage applying portion, the developing voltage applying portion, and the transfer voltage applying portion, so that
- in the developing portion, developer is supplied to the surface of the image bearing member, and
- in the transfer portion, the developer is supplied to the cleaning portion by generating an electrostatic force in the developer supplied to the surface of the image bearing member, such that the developer charged to the normal charging polarity moves from the transfer member to the image bearing member, and wherein a region of the surface of the image bearing member, to which developer is supplied in the second operation, includes a region where the second potential difference has been generated in the first operation immediately before the developer is supplied.

To solve the above problem, an image forming apparatus of the present invention includes:

- an image bearing member configured to rotate;
- a charging member configured to contact with the image bearing member and to rotate while forming a charging portion, the charging member charging a surface of the image bearing member at the charging portion;
- a charging voltage applying portion configured to apply charging voltage to the charging member;
- an exposure unit configured to expose the surface of the image bearing member charged by the charging member;

a developer bearing member configured to bear developer, face the image bearing member at a developing portion, and supply the developer to the surface of the image bearing member;

a developing voltage applying portion configured to apply developing voltage to the developer bearing member;

a transfer member configured to transfer the developer, which has been supplied to the surface of the image bearing member at a transfer portion, onto a transferred member;

a transfer voltage applying portion configured to apply transfer voltage to the transfer member;

a cleaning member configured to contact with the image bearing member at a cleaning portion which is formed on a downstream side of the transfer portion and on an upstream side of the charging portion in a rotating direction of the image bearing member; and a control portion configured to control the charging voltage applying portion, the developing voltage applying portion and the transfer voltage applying portion, wherein the control portion can execute a first operation to move the developer from a surface of the charging member to the surface of the image bearing member by controlling the charging voltage applying portion, and a second operation to supply the developer to the cleaning portion by controlling the charging voltage applying portion, the developing voltage applying portion and the transfer voltage applying portion, wherein in the first operation, between the charging member and the image bearing member, the control portion controls the charging voltage applying portion so as to form a first region of the image bearing member where a first potential difference is generated to generate an electrostatic force to move developer, which is charged to an opposite polarity to a normal charging polarity of the developer, from the charging member to the image bearing member, and a second region of the image bearing member where a second potential difference is generated to generate an electrostatic force to move developer, which is charged to the normal charging polarity, from the charging member to the image bearing member, wherein in the second operation, the control portion controls the charging voltage applying portion, the developing voltage applying portion, and the transfer voltage applying portion, so that in the developing portion, developer is supplied to the surface of the image bearing member, and in the transfer portion, the developer is supplied to the cleaning portion by generating an electrostatic force in the developer supplied to the surface of the image bearing member, such that the developer charged to the normal charging polarity moves from the transfer member to the image bearing member, wherein a third region of the surface of the image bearing member, to which developer is supplied in the second operation, includes the second region formed in the first operation.

According to the present invention, the productivity of image formation of an image forming apparatus which executes the maintenance operation in the post rotation period can be improved.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Embodiment 1

In Embodiment 1, a method for shortening the toner purge and charging roller cleaning by executing the toner purge and charging roller cleaning in parallel will be described.

Description on Image Forming Apparatus

Figure 1:
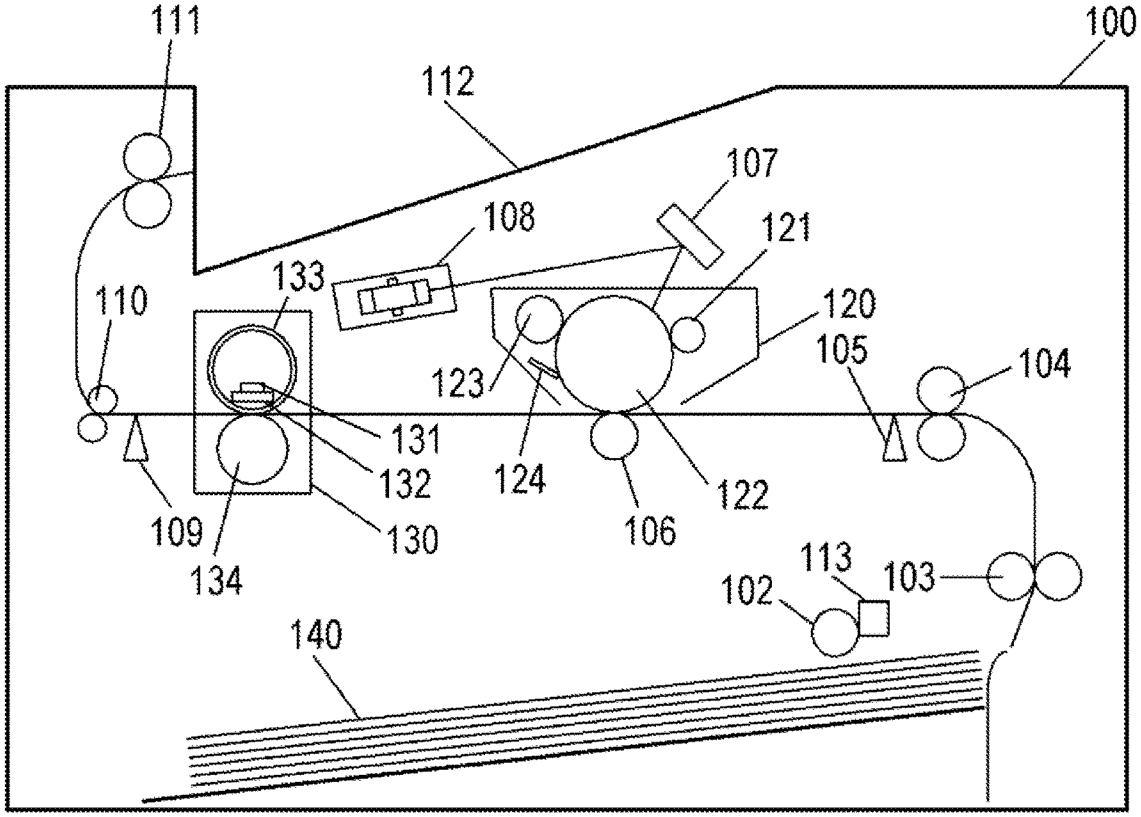
FIG. 1 is a schematic cross-sectional view of an image forming apparatus.

FIG. 1 is a diagram depicting a general configuration of an image forming apparatus 100 according to an embodiment of the present invention.

The image forming apparatus here, to which the present invention is applied, is typically an electrophotographic type or electrostatic recording type image forming apparatus, such as a copier, printer and a facsimile device.

In Embodiment 1, a monochrome type image forming apparatus, that is, an image forming apparatus which includes a single image forming portion, will be described as an example, but an image forming apparatus to which the present invention is applicable is not limited to this. For example, the present invention can be suitably applied to a full color type image forming apparatus, that is, an image forming apparatus which includes a plurality of image forming portions. A structural difference between the monochrome image forming apparatus and the color image forming apparatus is that a color and a number of colors that form an image are different. In other words, in the case of the monochrome image forming apparatus, a single color (typically black) image can be formed, but in the case of the color image forming apparatus, an arbitrary color of an image can be formed by superimposing a plurality of developer images having mutually different colors. Further, in the case of an intermediate transfer type color image forming apparatus, a developer image is first transferred from a photosensitive member (image bearing member) to an intermediate transfer member (second image bearing member), which is a first transferred member, and is then transferred from the intermediate transfer member to a recording material, which is a second transferred member. In the case of the monochrome image forming apparatus or a direct transfer type color image forming apparatus, on the other hand, a developer image is directly transferred from the photosensitive member to the recording material.

Image Forming Portion

An image forming portion includes an exposure portion and an image bearing member, and is a component of the image forming apparatus 100, including a member group directly related to forming a toner image (developer image), such as a charging member and developing member.

A process cartridge 120 is a cartridge in which a photosensitive drum 122 (image bearing member), a charging roller 123 (charging member), a developing roller 121 (developer bearing member), a cleaning blade 124 (cleaning member) and the like are integrated. The process cartridge 120 is attachable to/detachable from an apparatus main body of the image forming apparatus 100. A scanner unit 108, which is an exposure portion (exposure unit), includes a laser diode (light-emitting element), and emits laser light to the rotary-driven photosensitive drum 122 using a reflection mirror 107. Here the photosensitive drum 122 has been charged in advance by the charging roller 123. From the charging roller 123, a −1000V voltage, for example, is outputted, whereby the surface potential Vd of the photosensitive drum 122 is charged to −550V, for example. If an electrostatic latent image is formed by emitting laser light at this charging potential, the potential Vl at the portion where the electrostatic latent image is formed becomes −100V, for example. The developing roller 121 outputs a −400V voltage, for example, supplies toner (developer) to the electrostatic latent image on the photosensitive drum 122, and forms toner image on the photosensitive drum 122. A transfer roller 106 (transfer member) outputs a +1500V voltage, for example, and supplies charges from the rear face of the conveyed paper 140 (recording material), so as to transfer the toner image on the photosensitive drum 122 onto the conveyed paper 140. The untransferred toner remaining on the photosensitive drum 122 at this time is scraped off by the cleaning blade 124, and is collected in a waste toner container (not illustrated). Each potential indicated here is merely an example.

Fixing Portion

A fixing unit 130 is for fixing a toner image formed on the paper 140 by applying heat and pressure using a heater 132, a fixing film 133 and a pressure roller 134, and constitutes a fixing nip portion which has a predetermined width, and applies a predetermined contact pressure. By applying heat using the heater 132 and detecting a temperature using a thermistor 131, the fixing nip portion is controlled at a predetermined temperature, and in this state, the paper 140, on which an unfixed toner image has been transferred, is inserted into the fixing nip portion and is nipped and conveyed thereby. In this process of being nipped and conveyed in the fixing nip portion, the paper 140 is heated, and the unfixed toner image on the paper 140 is heated and fixed.

Paper Conveying Portion

A paper conveying portion is a component related to feeding and conveying the paper 140, such as each conveying roller including a paper feeding member to feed the paper 140 from a cassette, and sensors disposed on a conveying path.

When the paper feeding solenoid 113 is driven during the image forming operation, one sheet of paper on top of the stack of paper 140 is fed from the cassette by a paper feeding roller 102, and is conveyed by a conveying roller 103 and a resist roller 104. A resist sensor 105, installed on a conveying path, detects a front end portion and a rear end portion of the conveyed paper 140. Then in the image forming portion, the toner image on the photosensitive drum 122 is transferred onto the paper 140, then the toner image is heated and fixed by the fixing unit 130. The paper 140 that passed through the fixing unit 130 is detected by a fixing paper delivery sensor 109, conveyed by a paper delivery roller 110 and an FD roller 111, and is discharged to a paper delivery tray 112.

Description on System Configuration of Image Forming Apparatus

Figure 2:
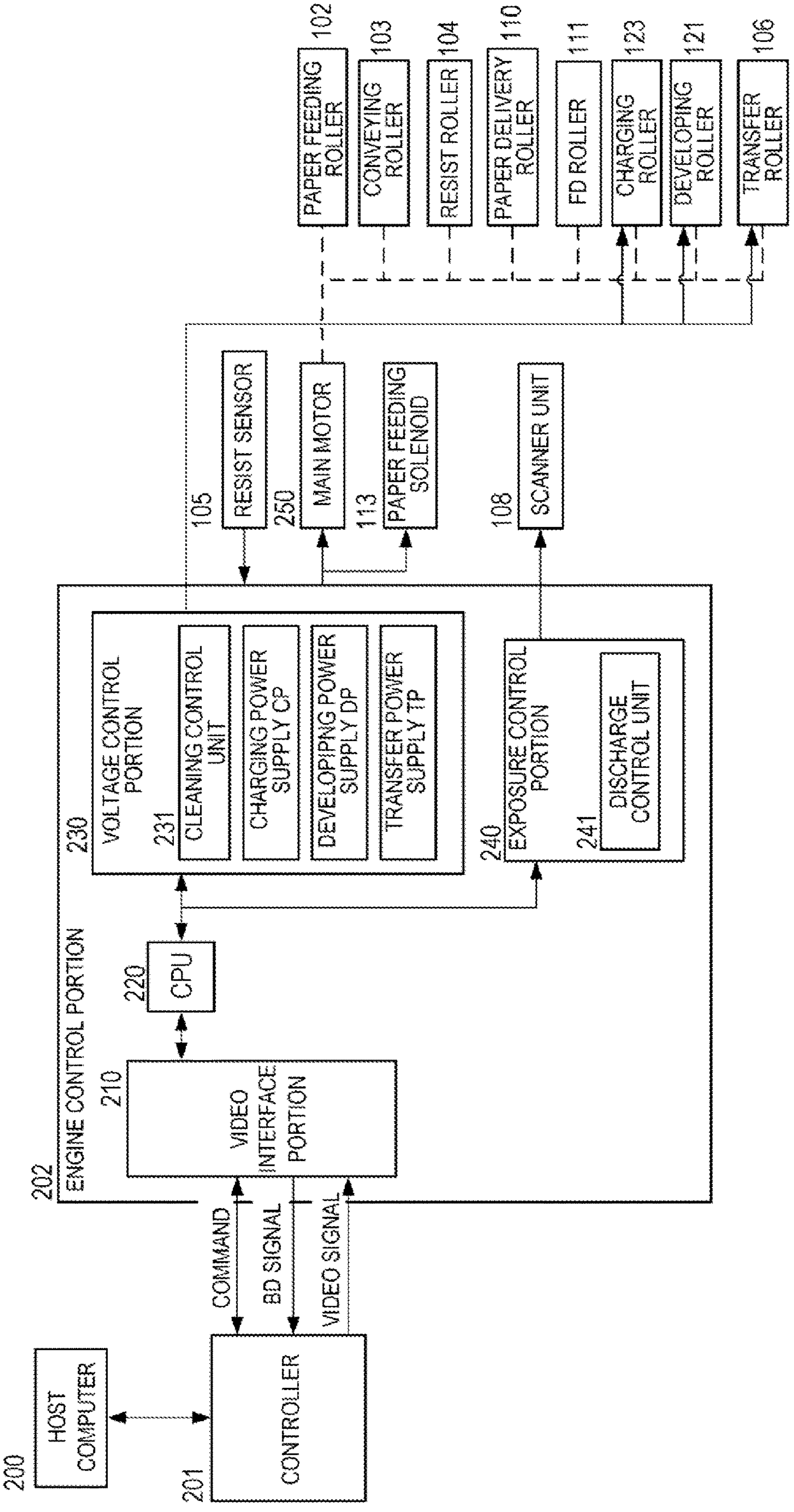
FIG. 2 is a system block diagram of the image forming apparatus.

A system configuration of the image forming apparatus 100 according to Embodiment 1 will be described with reference to FIG. 2. A controller 201 can mutually communicate with a host computer 200 and an engine control portion 202. When print data is inputted from the host computer 200, the controller 201 develops print data, and converts the data into image data for forming an image. Then in order to perform exposure based on the image data, the controller 201 generates video signals for exposure. When the generation of video signals completes, the controller 201 instructs a video interface portion 210 of the engine control portion 202 to start the image formation using a command. Then when the instruction to start the image formation is received from the video interface portion 210, a CPU 220 starts various actuators, such as a main motor 250, and starts preparation for the image formation. When the preparation of the image forming completes, the engine control portion 202 starts outputting an /BD signal, which becomes a reference timing of outputting a video signal, to the controller 201, and sequentially executes the above mentioned image forming operation.

The engine control portion 202 starts a main motor 250 (driving source) when the image forming operation is performed, and drives each roller related to conveying the paper 140, so as to control conveying the paper 140. The rollers related to conveying the paper 140 includes the paper feeding roller 102, the conveying roller 103, the resist roller 104, a transfer roller 106, the paper delivery roller 110, and the FD roller 111. The resist sensor 105 measures the paper interval in continuous paper passing (a plurality of papers 140 is continuously printed) based on the detection timings of the front end portion and the rear end portion of the paper 140 performed during conveying the paper 140. The engine control portion 202 determines the next paper feeding timing based on the paper length and paper interval, for example, drives the paper feeding solenoid 113, and feeds the next paper 140 at this paper feeding timing.

Figure 7:
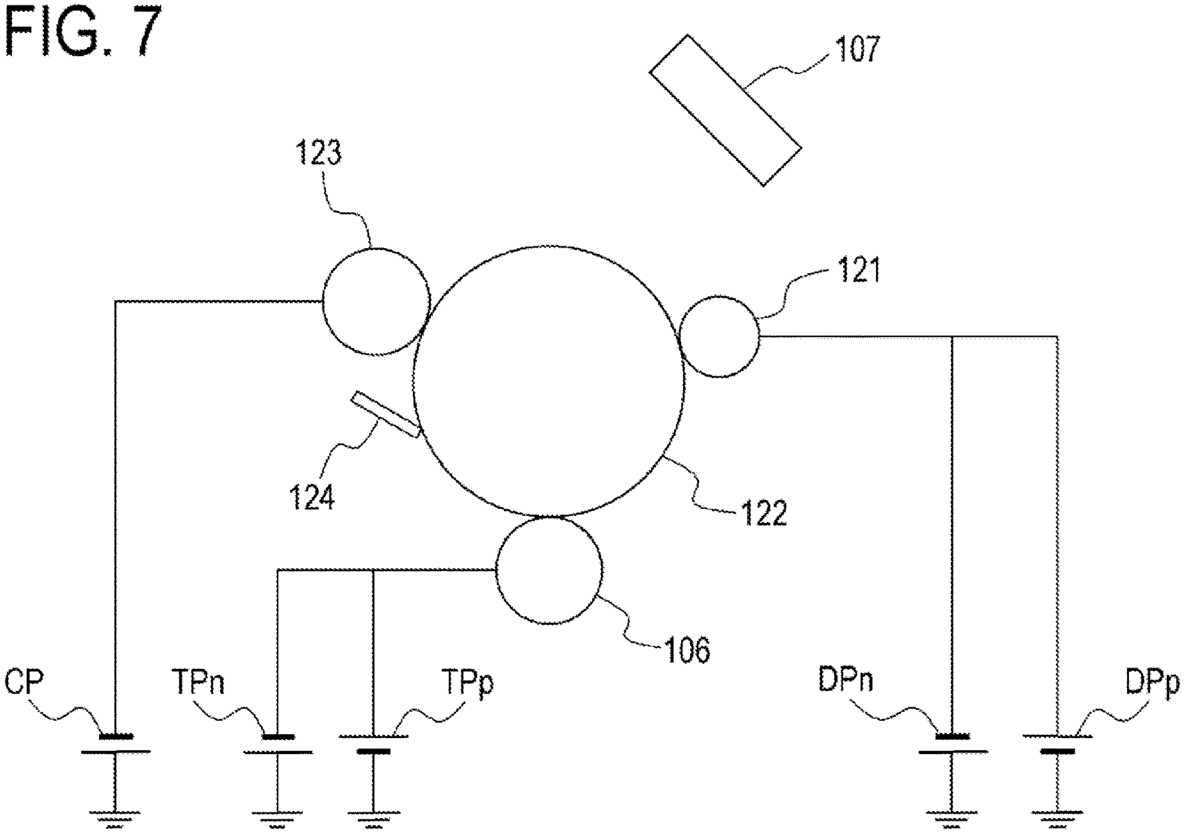
FIG. 7 is a schematic diagram depicting a voltage applying configuration according to Embodiments 1 and 2.

A voltage control portion 230 is configured to control voltage applied to the charging roller 123, the developing roller 121 and the transfer roller 106. As illustrated in FIG. 7, the voltage control portion 230 is configured so as to apply negative polarity voltage to the charging roller 123 from a power supply CP for applying charging voltage (charging voltage applying portion). The voltage control portion 230 is also configured so as to apply the negative polarity voltage to the developing roller 121 from a power supply DPn for applying developing voltage (developing voltage applying portion). Furthermore, the voltage control portion 230 is also configured so as to apply positive polarity voltage to the transfer roller 106 from a power supply TPp for applying transfer voltage (positive voltage applying portion), so as to apply negative polarity voltage to the transfer roller 106 from a power supply TPn for supplying non-transfer voltage (negative voltage applying portion) (transfer voltage applying portion). These polarities of the voltages are based on the case where the normal charging polarity of toner is the negative polarity. Therefore, needless to say, the polarity of each voltage mentioned above is inverted if the normal charging polarity of the toner is the positive polarity.

The image forming apparatus 100 according to Embodiment 1 does not include a development contact/separation mechanism that can contact the developing roller 121 and the photosensitive drum 122 at an appropriate timing, and is configured such that the developing roller 121 and the photosensitive drum 122 are in constant contact. Therefore in Embodiment 1, the voltage control portion 230 can apply a voltage, of an opposite polarity of the negative polarity, to the developing roller 121 from a power supply DPp for applying the developing voltage (developing voltage applying portion). In other words, in the case of not performing development, positive polarity voltage, which has the opposite polarity of the negative polarity (normal polarity of the toner), is applied to the developing roller 121, so as to prevent toner from being transferred to the photosensitive drum 122. Thereby an effect similar to separating the developing roller and the photosensitive drum, when development is not performed in the image forming apparatus that includes the development contact/separation mechanism, can be implemented. The image forming apparatus 100 may use the configuration of including the development contact/separation mechanism, where the developing roller 121 can contact with or separate from the photosensitive drum 122.

When the charging roller is cleaned, a cleaning controlling unit 231 applies positive polarity voltage and negative polarity voltage, with respect to the charging potential of the photosensitive drum 122, to the charging roller 123 at predetermined timings. By applying the positive polarity voltage and the negative polarity voltage respectively to the charging roller 123, adhered substances (including external additives of toner) on the charging roller 123 are transferred (moved) to the photosensitive drum 122 regardless the charging polarity thereof, so as to perform cleaning.

In Embodiment 1, the charging voltage applying portion has a configuration where only the power supply CP, to apply the negative polarity voltage, is included. Therefore applying the positive polarity voltage to the charging roller 123, with respect to the charging potential of the photosensitive drum 122, is implemented by not applying voltage to the charging roller 123. In other words, by setting the potential of the charging roller 123 to 0V, the potential of the charging roller 123 is controlled to the positive polarity side, with respect to the surface potential (negative polarity) of the photosensitive drum 122. A positive polarity voltage applying configuration may be added to the charging voltage applying portion.

The time required for the rise or fall of voltage when the voltage control portion 230 applies voltage to or stops applying voltage to the charging roller 123, the developing roller 121 and the transfer roller 106, is not considered here to simplify description.

An exposure control portion 240 is configured to perform setting for the scanner unit 108, so as to expose the photosensitive drum 122 with a predetermined quantity of light. In the case of toner purge, a discharging control unit 241 forms a toner image by exposing the photosensitive drum 122 at a predetermined timing with a predetermined quantity of light, and sends the toner image to the cleaning blade 124.

When the image formation and transfer of the image to the paper completes, a post rotation period starts to prepare for the next image forming operation. In the post rotation period, the above mentioned toner purge, charging roller cleaning and the like are executed when necessary as a maintenance operation of the image forming apparatus 100, and operation of the voltage control portion 230 and the actuator, such as the main motor 250, is stopped.

Here the adhered substances, such as the external additives of toner, which adhered to the photosensitive drum 122, including a non-image forming portion, may be adsorbed to the surface of the photosensitive drum 122 with stronger electrostatic attraction force, since the transfer portion receives discharge caused by the transfer voltage, and the positive polarity charging amount increases therein. This phenomena is generated notably when a material, of which normal charging polarity is positive polarity, which is the opposite polarity of the normal charging polarity of toner (negative polarity), is used as the external additives as in the case of Embodiment 1. As a result, the adhered substances may remain without being removed by the cleaning blade 124. Further, in a case where the image forming operation at a low printing ratio continues, a layer formed by toner and external additives (hereafter called "blocking layer") at the top of the cleaning layer is not formed very well. If the blocking layer is insufficient, the toner and external additives more easily slip through the contact portion between the cleaning blade 124 and the photosensitive drum 122, and the frictional force between the cleaning blade 124 and the photosensitive drum 122 increases as well, which may cause abnormal sounds and the blade to turn up deform. Further, if the cleaning blade 124 slightly vibrates due to the increase in frictional force, the external additives included in the blocking layer may slip through the contact portion between the cleaning blade 124 and the photosensitive drum 122. Some external additives which slipped through the contact portion between the cleaning blade 124 and the photosensitive drum 122 are charged to a positive polarity, and adhere to the charging roller 123 to which negative polarity charging voltage is applied. If this state continues for a long time, the external additives having positive polarity accumulate on the charging roller 123, and may cause imaging problems due to uneven charging and the like.

Toner purge is an operation to form a predetermined toner image on the photosensitive drum 122 when an image is not formed, and supply this toner image to the contact portion between the cleaning blade 124 and the photosensitive drum 122. Thereby the frictional force at the contact portion between the cleaning blade 124 and the photosensitive drum 122 is reduced, and the blocking layer at this contact portion can be maintained, so as to prevent the toner and the external additives from slipping through the cleaning blade 124. The method of toner purge is not limited to the above method of using the toner image of being exposed to the photosensitive drum 122, but may be any method that can supply toner from the developing roller 121 to the photosensitive drum 122.

In some cases when the image forming apparatus 100 is used for a long time, completely preventing the toner and the additives from slipping through the contact portion between the cleaning blade 124 and the photosensitive drum 122 may be difficult, even if the toner purge is performed. As a result, the external additives and the like having positive polarity may adhere to the charging roller 123. To clean such adhered substances, charging roller cleaning is performed. For example, by switching the voltage to be applied to the charging roller 123, between the positive polarity side and the negative polarity side with respect to the charging potential of the photosensitive drum 122, the adhered substances, such as external additives having positive polarity and negative polarity, are transferred to the photosensitive drum 122 side.

These operations of toner purge and charging roller cleaning, during which image formation cannot be performed, become a factor in the drop in productivity of the image forming apparatus 100. Further, depending on the conditions when using the apparatus, a number of times of operation may need to be increased or an operation period may need to be extended to obtain a sufficient maintenance effect (e.g. cleaning effect) in each operation.

A configuration characteristic to the image forming apparatus 100 according to Embodiment 1 of the present invention to improve productivity, including shortening the maintenance operation period for toner purge, charging roller cleaning and the like, and improving the maintenance effect in each operation, will be described. For an operation that can be executed in the post rotation period, the toner purge and the charging roller cleaning will be described in the following example, but the present invention is not limited to these operations.

Figure 3:
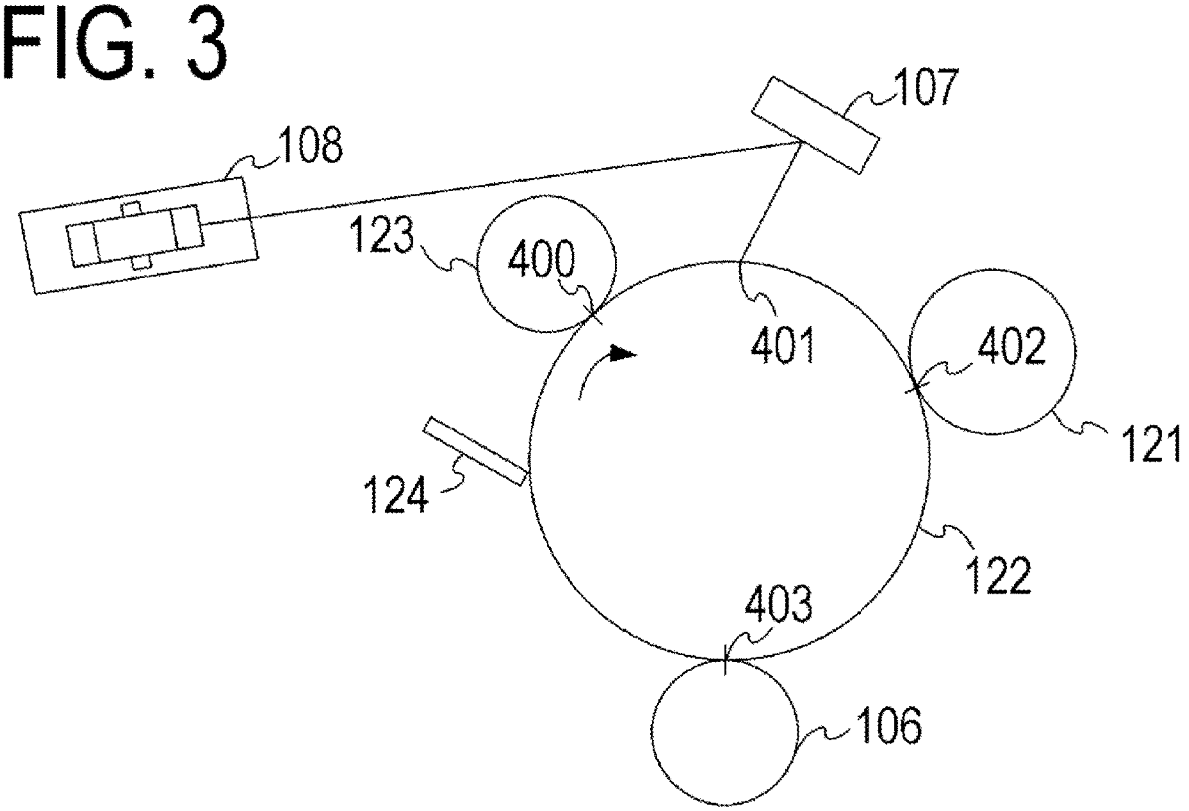
FIG. 3 is a configuration diagram depicting details of an image forming portion.

The dimensions of the image forming portion according to Embodiment 1 will be described first with reference to FIG. 3. As an example, in the image forming apparatus 100 of Embodiment 1, the process speed is 260 mm/sec. The outer diameter of the photosensitive drum 122 is 24 mm (perimeter is about 75.4 mm), and the outer diameter of the charging roller 123 is 8.4 mm (perimeter is about 26.4 mm).

At a position of a peripheral surface of the rotating photosensitive drum 122, the photosensitive drum 122 and the charging roller 123 contact with each other, whereby a nip portion 400 is formed. An exposure position 401, which is irradiated with the laser light emitted from the scanner unit 108, is formed on the downstream side of the position where the nip portion 400 is formed (charging position), in the rotating direction of the photosensitive drum 122 around the peripheral surface of the photosensitive drum 122. A nip portion 402, where the photosensitive drum 122 and the developing roller 121 contact, is formed on the downstream side of this exposure position 401, in the rotating direction of the photosensitive drum 122 around the peripheral surface of the photosensitive drum 122 (the nip portion 402 is formed on the opposite part in the case of a non-contact development type apparatus). A nip portion 403, where the photosensitive drum 122 and the transfer roller 106 contact, is formed on the downstream side of the position where the nip portion 402 is formed (developing portion) in the rotating direction of the photosensitive drum 122 around the peripheral surface of the photosensitive drum 122. A contact portion (cleaning portion), where the cleaning blade 124 contacts with the photosensitive drum 122, is formed on the downstream side of the position where this nip portion 403 is formed (transfer position) in the rotating direction of the photosensitive drum 122 around the peripheral surface of the photosensitive drum 122, and on the upstream side of the charging position.

Here the distance from the nip portion 400 to the exposure position 401 around the peripheral surface of the photosensitive drum 122 is 5.6 mm. The distance from the exposure position 401 to the nip portion 402 is 12.2 mm, the distance from the nip portion 402 to the nip portion 403 is 21.6 mm, and the distance from the nip portion 403 to the nip portion 400 is 36.0 mm. The distance from the nip portion 403 to the cleaning position (position where the cleaning blade 124 contacts with the photosensitive drum 122) is 24.9 mm, and the distance from the cleaning position to the nip portion 400 is 11.1 mm.

In Embodiment 1, toner, of which average particle diameter is 7 μm and normal charging polarity is negative polarity, is used, and the toner used here is polymerized toner generated by a polymerization method, for example. The toner of Embodiment 1 does not include a magnetic component, but is a non-magnetic one-component developer, where toner is carried on the developing roller 121 mainly by an inter-molecular force or an electrostatic force. However a one-component developer containing a magnetic component may be used. In some cases, the one-component developer may contain additives (e.g. wax, silica particles) to adjust the fluidity and charging performance of toner. Further, a two-component developer constituted of non-magnetic toner and a magnetic carrier may be used for the developer.

In Embodiment 1, a developer prepared by externally adding a positive external additive to toner is used. The positive external additive is an external additive having reverse polarity of toner of which normal charging polarity is a negative polarity. The positive external additive separates from the surface of toner by the image forming operation, and adheres to the surface of such a member as the developing roller 121. The positive external additive adhering to the surface of the member has a negative polarity charge applying property for the toner, and can control the charging amount at the optimum. By optimizing the charging amount, excessive toner that causes fogging can be prevented from adhering to the non-image forming portion, for example.

As mentioned above, the image forming operation cannot be performed during execution of toner purge and charging roller cleaning. Therefore in Embodiment 1, operation of each portion is controlled such that the operation period (execution period) of the toner purge and the operation period (execution period) of the charging roller cleaning overlap with each other.

The toner purge is a toner discharging operation to supply toner to the contact portion (cleaning position) where the cleaning blade 124 contacts with the photosensitive drum 122. In other words, a toner image is developed on the photosensitive drum 122, and this toner image is removed by the cleaning blade 124 at the transfer position, without transferring the toner image to a transferred member. During this operation, at least the following periods are generated: a period where voltage is applied to the charging roller 123 to charge the photosensitive drum 122; a period where the scanner unit 108 exposes the photosensitive drum 122; and a period where transfer voltage, to generate an electrostatic force without transferring the toner image to the transfer roller 106 (electrostatic force for the toner charged to the normal charging polarity to move from the transfer roller 106 to the photosensitive drum 122), is applied to the transfer roller 106. The voltage applied at this time is hereafter called "non-transfer voltage".

The charging roller cleaning is a cleaning operation to remove such adhered substances as toner and external additives from the charging roller 123. In order to transfer the adhered substances from the charging roller 123 to the photosensitive drum 122, two types of potential differences, of which polarities are different with respect to the surface potential formed on the photosensitive drum 122 at the charging position, are alternately generated between the charging roller 123 and the photosensitive drum 122. One of the two types of potential differences is a first potential difference to generate an electrostatic force to transfer the adhered substances, which are charged to an opposite polarity of the normal charging polarity of the toner, from the charging roller 123 to the photosensitive drum 122. The other potential difference is a second potential difference to generate an electrostatic force to transfer the adhered substances, which are charged to the normal charging polarity of toner, from the charging roller 123 to the photosensitive drum 122. The first potential difference is a potential difference with which the potential of the charging roller 123 increases from the surface potential of the photosensitive drum 122 to the side of opposite polarity of the normal charging polarity of the toner. The second potential difference is a potential difference in which the potential of the charging roller 123 increases from the surface potential of the photosensitive drum 122 to the side of the same polarity as the normal charging polarity of the toner. The voltage to be applied to the charging roller 123 is controlled such that these two types of potential differences are generated at least once respectively, preferably a plurality of times respectively.

In the case where the second potential difference is the same as the potential difference between the charging roller 123 and the photosensitive drum 122, which is generated when an image is formed, the first potential difference may be generated once during the flow from the image forming operation to the maintenance operation. In other words, the charging roller cleaning operation, generating the second potential difference and the first potential difference once respectively, may be performed by maintaining the second potential difference generated during the image forming operation, and generating the first potential difference once thereafter.

In Embodiment 1, to generate the first potential difference, the potential of the charging roller 123 is set to 0V without applying voltage to the charging roller 123, with respect to the photosensitive drum 122 of which surface potential has the opposite polarity of the normal charging polarity of the toner. To generate the second potential difference, the voltage is applied to the charging roller 123, so that the potential of the charging roller 123 is increased to the side of the same polarity as the normal charging polarity of the toner, with respect to the surface potential of the photosensitive drum 122. In other words, during the charging roller cleaning operation, at least a period in which voltage is applied to the charging roller 123 and a period in which voltage is not applied to the charging roller 123 are generated. In Embodiment 1, the period in which voltage is applied to the charging roller 123 and the period in which voltage is not applied to the charging roller 123 are set respectively, but a charging voltage may be constantly applied to the charging roller 123. For example, the charging voltage to be applied when the first potential difference is generated may have the same polarity as the charging voltage to be applied when the second potential difference is generated, and an absolute value of the charging voltage to be applied when the first potential difference is generated may be small. In this case, the first potential difference is generated by applying a charging voltage that is smaller than the absolute value of the surface potential formed on the photosensitive drum 122. Further, as mentioned above, the charging voltage to be applied when the first potential difference is generated may have reverse polarity of the charging voltage to be applied when the second potential difference is generated.

In Embodiment 1, operation execution timings are adjusted so that at least a part of each period mentioned above, generated during the charging roller cleaning operation as the first operation, and at least a part of each period mentioned above generated during the toner purge operation as the second operation, become a common period. In other words, the execution timing of each operation is adjusted such that, on the surface of the photosensitive drum 122, at least a region where the second potential difference is generated during the charging roller cleaning (second region) is included in a region where toner is supplied during the toner purge (third region). Specifically, the execution timing of each operation is adjusted such that, on the surface of the photosensitive drum 122, the region where the second potential difference is generated during the charging roller cleaning becomes the region where toner is supplied during the toner purge when this region passes the developing portion for the first time. In this case where the second potential difference is generated for a plurality of times, the execution timing of each operation is adjusted such that, at least a part of the region on the surface of the photosensitive drum 122, where the second potential difference is generated for a plurality of times, becomes the developer supplying region during the toner purge when this part passes the developing portion for the first time after the second potential difference is generated. In other words, the execution timing of each operation is adjusted such that, on the surface of the photosensitive drum 122, the region where toner is supplied during the toner purge includes the region where the second potential difference is generated during the charging roller cleaning immediately before the developer image is developed. Thereby the operation period (execution period) of the toner purge and the operation period (execution period) of the charging roller cleaning can overlap at least partially.

Figure 4:
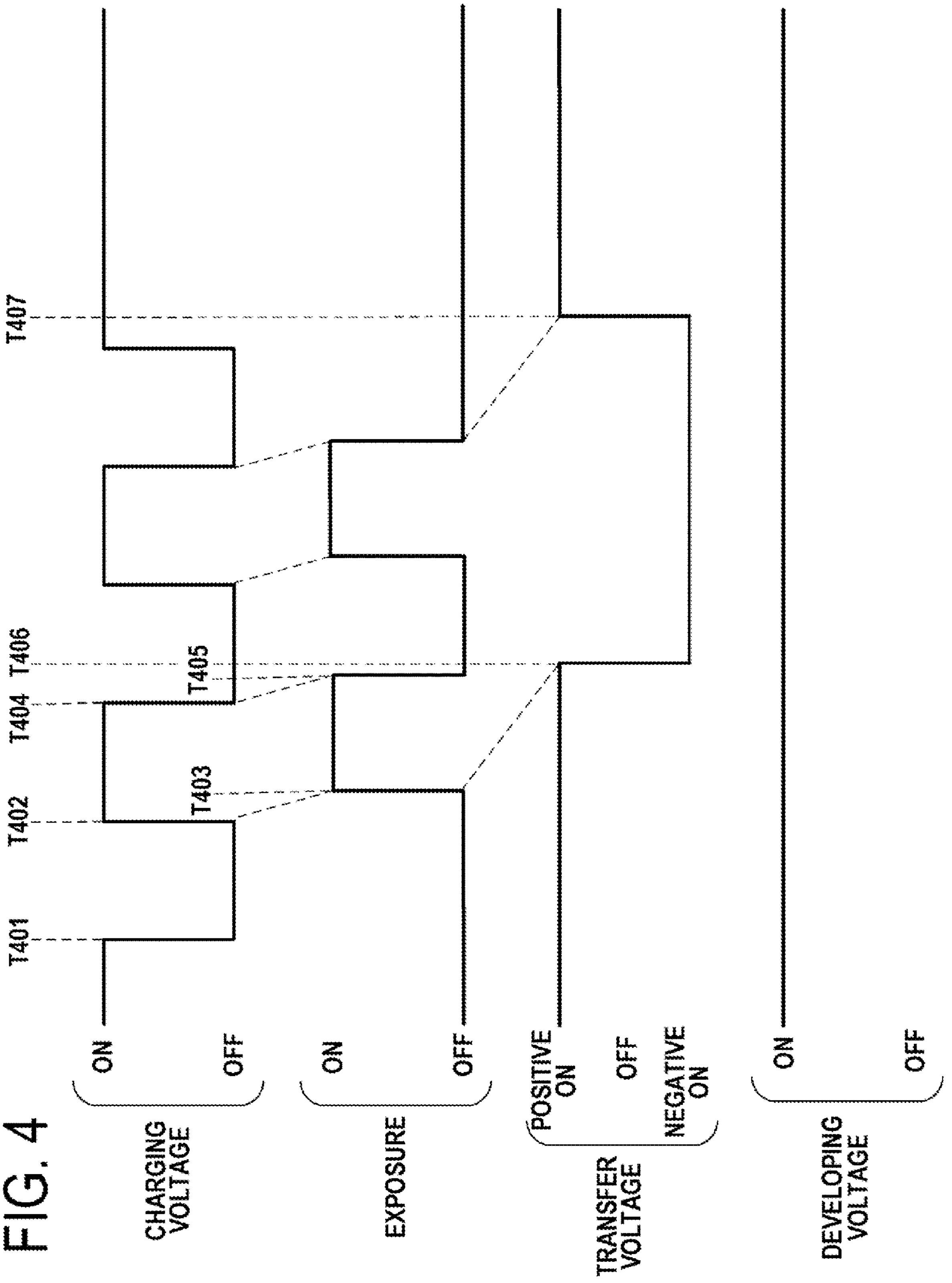
FIG. 4 is a timing chart depicting an operation of Embodiment 1.

A method for shortening the post rotation period by executing the toner purge and the charging roller cleaning in parallel will be described more specifically with reference to FIG. 4. FIG. 4 is a timing chart indicating the operation of each member when the toner purge and the charging roller cleaning are executed in parallel in the post rotation.

FIG. 4 indicates an example of performing the charging voltage ON/OFF operation in 3 sets for the charging roller cleaning, but the present invention is not limited to this example. Further, FIG. 4 indicates an example of performing exposure twice during the toner purge, whereby the toner image is formed twice, but the present invention is not limited to this example. For example, the number of sets of the charging voltage ON/OFF operation to be performed may be determined by estimating the amount and state of the adhered substances on the charging roller 123 based on such information as the durability state of the image forming apparatus or the image forming portion, and the environment in which the apparatus is installed. Instead of a number of sets of the charging voltage ON/OFF operation, a number of sets of operation to change the charging voltage may be set. In the same manner, a number of times of executing the toner purge and a width of exposure ON (width of toner image) may also be determined based on the durability state, environment, and the like.

First at T401, for the charging roller cleaning, the charging voltage is turned OFF (charging voltage is set to 0V), so that the charging roller 123 is set to positive polarity with respect to the surface potential Vd (−550V) of the photosensitive drum 122. Then at T402, for the charging roller cleaning, the charging voltage is turned ON, so that the voltage is set to negative polarity with respect to the surface potential Vd of the photosensitive drum 122. By switching the charging voltage of the charging roller 123 ON/OFF like this, the surface of the charging roller 123 is cleaned.

In Embodiment 1, the charging voltage OFF time (T401 to T402) and the charging voltage ON time (T402 to T404)

are 101 msec. respectively, which corresponds to one rotation of the charging roller 123. In other words, each of the period for generating the first potential difference and the period for generating the second potential difference is a period for the entire peripheral surface of the charging roller 123, which contacts the rotating photosensitive drum 122 and is driven and rotated thereby, to contact the surface of the photosensitive drum 122 in the rotating direction, and is a period corresponding to one rotation of the charging roller 123. This is for transferring the adhered substances to the photosensitive drum 122 side during one rotation of the charging roller 123. In Embodiment 1, the magnitude of voltage applied to the charging roller 123 when the second potential difference is generate is the same as the magnitude of voltage applied to the charging roller 123 when an image is formed, but may be a different magnitude. In other words, in a state where the amount of adhered substances is high, the absolute value of the charging voltage may be set to be higher than that at image formation, for example. This aspect is the same for the magnitude of voltage applied to other components.

Then at T403, for the toner purge, exposure is turned ON by the scanner unit 108 and the surface potential of the photosensitive drum 122 is set to Vl, and the image is developed by the developing roller 121 to form the toner image. At T405, exposure is turned OFF and formation of the toner image is stopped. T406 indicates a timing when the front end of the toner image formed by the toner purse reaches the transfer roller 106. Here to prevent the adhesion of the toner image to the transfer roller 106, negative voltage is applied to the transfer roller 106, so that the transfer voltage applied to the transfer roller 106 has negative polarity with respect to the surface potential generated on the photosensitive drum 122 at the transfer portion, so as to repel with the normal charging polarity (negative polarity) of toner. T407, on the other hand, indicates a timing when the rear end of the last toner image, which was formed in the toner purge, passes through the transfer roller 106, and after this timing, positive voltage is applied again to the transfer roller 106, since there is no longer a need to prevent the adhesion of the toner image. After T407, a configuration to not apply transfer voltage may be used, or a configuration to continuously apply negative voltage may be used.

As indicated in FIG. 4, the period of repeatedly applying voltage to the charging roller 123 to generate the second potential difference in the charging roller cleaning, and the period of exposing the photosensitive drum 122 to form a latent image of the toner image in the toner purge partially overlap. In other words, the voltage application to the charging roller 123 in the charging roller cleaning and the exposure of the photosensitive drum 122 by the scanner unit 108 in the toner purge are simultaneously executed during a certain period at least temporarily. Further, the period of repeatedly applying voltage to the charging roller 123 to generate the second potential difference in the charging roller cleaning, and the period of applying voltage to the transfer roller 106 to not transfer the toner image to the transferred member in the toner purge partially overlap. In other words, the charging voltage application to the charging roller 123 in the charging roller cleaning and the transfer voltage application to not transfer toner to the transfer roller 106 from the photosensitive drum 122 in the toner purge are executed simultaneously during a certain period at least temporarily. By this overlapping of each period described above, the operation related to the toner purge and the operation related to the charging roller cleaning are at least partially executed in parallel simultaneously.

In Embodiment 1, during the charging voltage ON time (T402 to T404), exposure to form the toner image is turned ON from T403 to T405, which is a timing when the Vd surface of the photosensitive drum 122, facing the charging roller 123, reaches the exposure position 401, but the present invention is not limited to this example. Since the charges on the photosensitive drum 122 are not discharged immediately, exposure on the surface of the photosensitive drum 122, facing the charging roller 123, may be turned ON to form a toner image during the charging voltage OFF time (T401 to T402), for example.

As described, by performing the toner purge and the charging roller cleaning in parallel, the post rotation period can be shortened compared with the case of executing the toner purge and the charging roller cleaning in series, such as executing the charging roller cleaning after executing the toner purge.

Embodiment 2

In Embodiment 2, a method for shortening the period of the toner purge and the charging roller cleaning by executing the toner purge and the charging roller cleaning in parallel just like Embodiment 1, and improving the cleaning effect of the charging roller cleaning, will be described. The process speed and the dimensions of each member of the image forming apparatus according to Embodiment 2 are the same as Embodiment 1, and in the following description, a same component as Embodiment 1 is denoted with the same reference number, and description thereof will be omitted.

Figure 5:
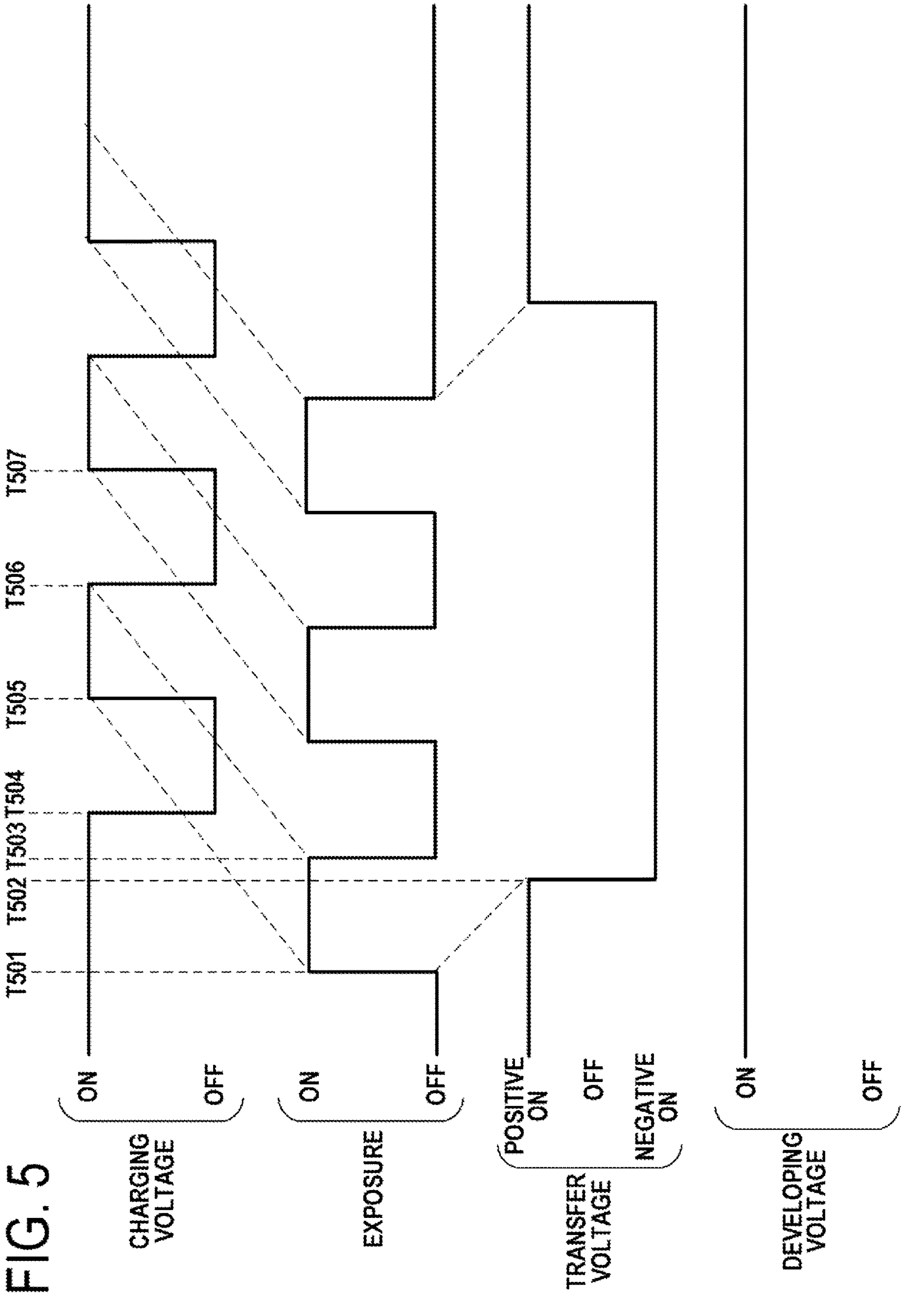
FIG. 5 is a timing chart depicting an operation of Embodiment 2.

FIG. 5 is a timing chart indicating the operation of each member of Embodiment 2. Just like Embodiment 1, the charging voltage ON time (T505 to T506), the charging voltage OFF time (T504 to T505) and the exposure ON time (T501 to T503) are 101 msec. respectively, which corresponds to 1 rotation of the charging roller 123.

First, at T501, for the toner purge, the exposure is turned ON by the scanner unit 108 and the surface potential of the photosensitive drum 122 is set to Vl, and the toner image is formed by the developing roller 121. T502 indicates a timing when the front end of the toner image formed at T501 reaches the transfer roller 106. At this timing, the transfer voltage to be applied to the transfer roller 106 is switched from voltage having polarity to transfer the toner image to the transferred member (that is, a voltage to adhere the toner image to the transfer roller 106), to voltage having polarity to not transfer the toner image to the transferred member. In other words, in order to prevent adhering of the toner image, formed on the photosensitive drum 122, to the transfer roller 106 at the transfer portion, voltage having negative polarity, which repels the normal charging polarity (negative polarity) of the toner, is applied to the transfer roller 106. The magnitude of voltage here (non-transfer voltage) is the magnitude with which the transfer voltage to be applied to the transfer roller 106 increases to the negative polarity side, with respect to the surface potential formed on the photosensitive drum 122, at the transfer portion. Then at T503, exposure is turned OFF and forming of the toner image is stopped.

Then at T504, for the charging roller cleaning, the charging voltage is turned OFF, so that the charging roller 123 is set to the positive polarity with respect to the surface potential Vd of the photosensitive drum 122. Then at T505, for the charging roller cleaning, the charging voltage is turned ON so that the voltage that becomes the negative polarity with respect to the surface potential Vd of the photosensitive drum 122 is applied.

Here the surface of the photosensitive drum 122, which was exposed in T501 to T503 and of which surface potential became Vl, is controlled at a timing to be an opposing portion of the charging roller 123 in the charging voltage ON period (T505 to T506). In other words, on the surface of the photosensitive drum 122, a region exposed in the toner purge becomes a region where the second potential difference is generated in the charging roller cleaning when this region reaches the charging position. Here the charging voltage of the charging roller 123 is −1000V, and the surface potential of the opposing portion of the photosensitive drum 122 is Vl (−100V), that is, a potential difference is generated. Hence because of discharge, the amount of charges having positive polarity increases in the external additives adhering to the charging roller 123. In other words, in the charging roller cleaning, the potential difference between the potential of the charging roller 123 to generate the second potential difference in the charging roller cleaning and the surface potential of the photosensitive drum 122 generated by exposure in the toner purge is the potential difference to generate discharge between the charging roller 123 and the photosensitive drum 122. This means that the exposure by the scanner unit 108 in T501 to T503 is the exposure for the toner purge, and is also the exposure to generate the discharge generation potential to enhance the effect of the charging roller cleaning thereafter.

Then in T506 to T507, the charging voltage is turned OFF, hence the charging roller 123 becomes 0V. Here the surface potential of the opposing portion of the photosensitive drum 122 has been charged at Vd (−550V), hence in the external additives of which positive charge amount increased on the charging roller 123, the force to transfer from the charging roller 123 to the photosensitive drum 122 increases, and the cleaning effect improves thereby.

As described above, by matching a surface on the photosensitive drum 122, of which surface potential has become Vl by the exposure, with the opposing portion of the charging roller 123 of which charging voltage is ON, cleaning effect of the external additives adhering to the charging roller 123 can be improved. By the improvement of the cleaning effect, a number of times of charging voltage ON/OFF operations may be decreased, so as to shorten the charging roller cleaning.

Embodiment 3

According to the configuration of Embodiment 3, a common power supply is used for the charging voltage and for the transfer negative voltage (non-transfer voltage), so as to downsize the image forming apparatus and reduce cost thereof.

Figure 8:
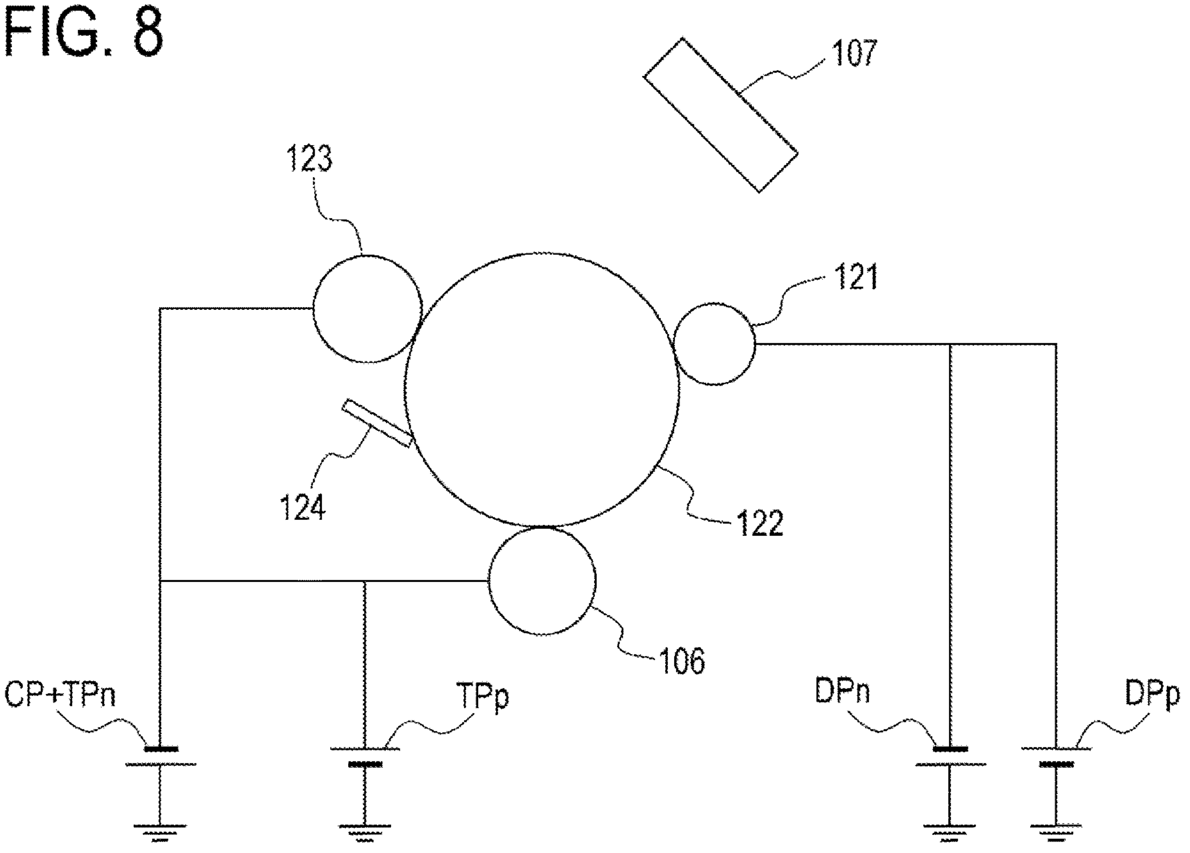
FIG. 8 is a schematic diagram depicting a voltage applying configuration according to Embodiment 3.

In other words, as illustrated in FIG. 8, the voltage control portion 230 is configured such that voltage of negative polarity can be applied to the charging roller 123 from a common power supply (CP+TPn), which functions as both a power supply to apply the charging voltage, and a power supply to apply the transfer voltage of negative polarity (non-transfer voltage). The voltage control portion 230 also plays a role of a transfer voltage applying portion, configured such that voltage of positive polarity can be applied to the transfer roller 106 from a power supply TPp for applying the transfer voltage (positive voltage applying portion), and voltage of negative polarity can be applied to the transfer roller 106 from the common power supply (CP+TPn) (negative voltage applying portion) (transfer voltage applying portion). These polarities of voltages are based on the case where the normal charging polarity of toner is the negative polarity. Therefore needless to say, the polarity of each voltage mentioned above is inverted if the normal charging polarity of the toner is the positive polarity.

In the configuration of Embodiment 3, where a common power supply is partially used as described above, a method for performing the toner purge and the charging roller cleaning in parallel as in the case of Embodiment 2, and also for improving the cleaning effect of the charging roller cleaning, will be described.

In the case of using a common power supply for the charging voltage and the transfer negative voltage (non-transfer voltage), if the voltage control portion 230 outputs the charging voltage −1000V to the charging roller 123, −1000V is outputted to the transfer roller 106 as well. In other words, in this configuration, if voltage is outputted to one of the charging roller 123 and the transfer roller 106, the voltage is applied to the other as well. In the case where the positive voltage and the negative voltage are superimposed and outputted to the transfer roller 106, however, positive voltage is outputted with priority in the configuration of Embodiment 3. Here, however, the positive voltage and the negative voltage may be simply added instead. In other words, in a state where +200V of positive voltage and −500V of negative voltage are applied, −300V may be outputted as the transfer voltage. Further, a diode or a resistor may be inserted, or a switching mechanism may be disposed, so that negative voltage exceeding a certain value is not applied as the transfer voltage.

In Embodiment 3, the process speed and the dimensions of each member of the image forming apparatus are the same as Embodiment 1, and in the following description, a same component as Embodiment 1 is denoted with a same reference number, and description thereof will be omitted.

Figure 6:
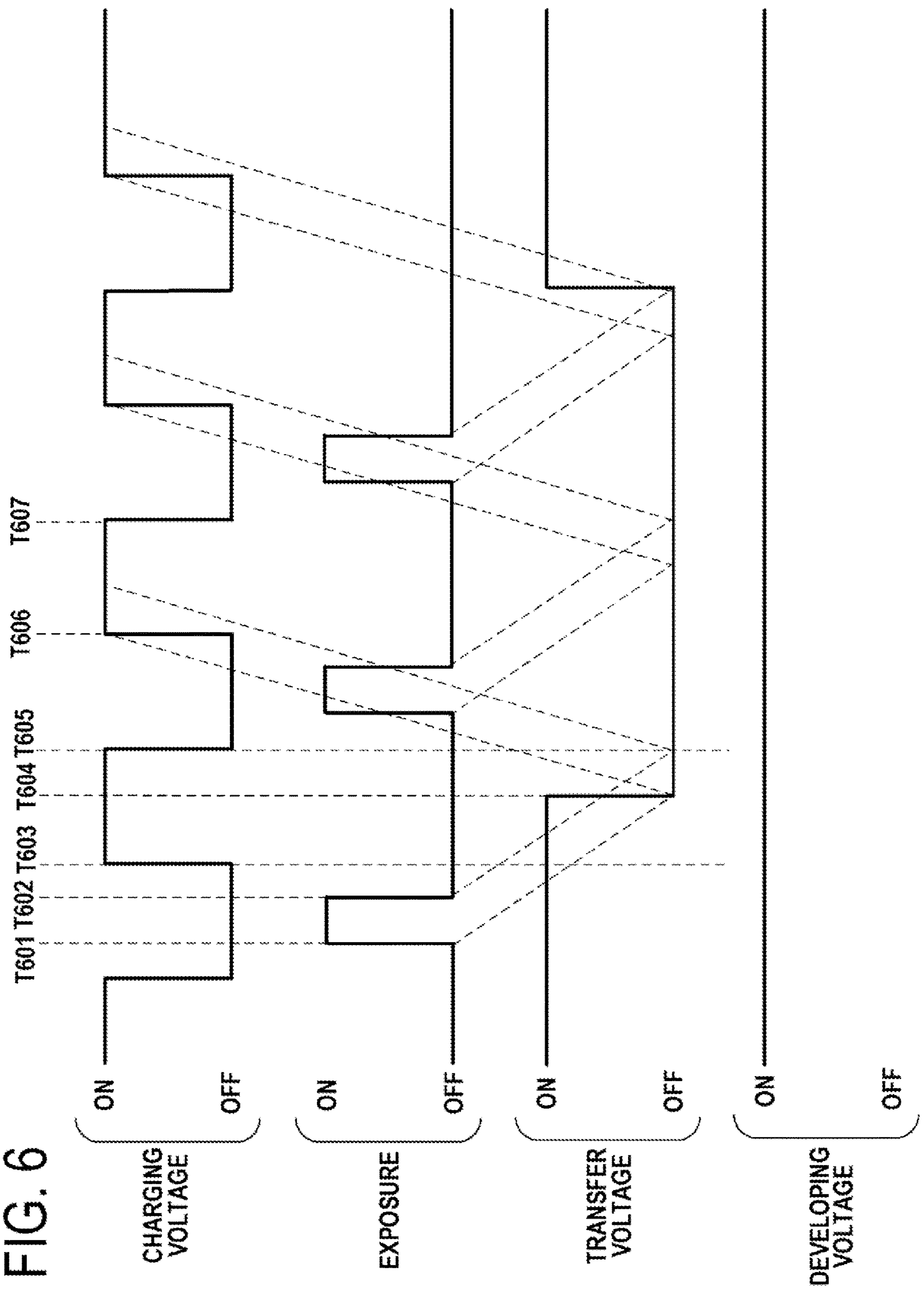
FIG. 6 is a timing chart depicting an operation of Embodiment 3.

FIG. 6 is a timing chart indicating operation of each member of Embodiment 3.

ON/OFF of the transfer voltage in FIG. 6 indicates the ON/OFF of positive voltage. Therefore in FIG. 6, in a state where the charging voltage is ON and the transfer voltage is OFF, −1000V is applied to the transfer roller 106, the same as for the charging roller 123. In the state where the charging voltage is ON and the transfer voltage is ON, the positive voltage is applied with priority over the negative voltage, as described above, hence +1500V, for example, is applied to the transfer roller 106.

As described in Embodiments 1 and 2, when the toner image formed in the toner purge passes through the transfer roller 106, negative voltage needs to be applied to generate a potential difference, so that the toner image does not adhere to the transfer roller 106. In Embodiment 3, however, a common power supply is used for the charging voltage and the transfer negative voltage (non-transfer voltage), as mentioned above, hence in the case of applying negative voltage to the transfer roller 106, the charging voltage needs to be ON, that is, here timings are restricted.

With the foregoing in view, in Embodiment 3, the exposure ON time (T601 to T602) is set to 36 msec., in which the adhesion of toner image to the transfer roller 106 can be avoided, and the surface on the photosensitive drum 122 (surface where the toner image is formed), of which surface potential became Vl by exposure, can be matched with the opposing portion of the charging roller 123 when the charging voltage is turned ON. In other words, as indicated in FIG. 6, on the surface of the photosensitive drum 122, a region exposed by the scanner unit 108 (a region where the toner image is formed) reaches the transfer position at a timing when the charging voltage is applied. Because of this timing of applying the charging voltage, the non-transfer voltage of negative polarity is applied to the transfer roller 106 at the timing when the toner image reaches the transfer position.

The charging voltage ON time (T603 to T605) and the charging voltage OFF time (T605 to T606) are set to 101 msec., which correspond to one rotation of the charging roller 123, just like Embodiment 1.

First, for the toner purge, a toner image is formed by turning exposure ON/OFF using the scanner unit 108 at T601 and T602, and the transfer voltage is turned OFF at T604 when the toner image reaches the transfer roller 106. While the toner image is passing through the transfer roller 106, the charging voltage needs to be ON to prevent the adhesion of the toner image, hence the toner image passes through the transfer roller 106 in the period from T603 to T605, as indicated by the diagonal broken lines in FIG. 6.

Then, just like Embodiment 2, it is controlled such that the surface on the photosensitive drum 122, which is exposed and of which surface potential became Vl, becomes the opposing portion of the charging roller 123 in the charging voltage ON period (T606 to T607). Thereby the external additives on the charging roller 123 are charged to the positive polarity, and the cleaning effect can be improved.

As described above, an effect similar to Embodiment 2 can be implemented in the configuration of Embodiment 3 as well, where a common [power supply] is used for the charging voltage and the transfer negative voltage (non-transfer voltage). In other words, while the toner purge and the charging roller cleaning are performed in parallel, timing is controlled so that the surface on the photosensitive drum 122, which became Vl by exposure, reaches the opposing portion of the charging roller 123 when the charging voltage is turned ON, whereby the cleaning effect can be improved.

In Embodiment 3 described above, the exposure ON time during the toner purge is 36 msec. to control the timing, but [the present invention] is not limited to this example, and the charging voltage ON/OFF time may be changed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-212422, filed on Dec. 28, 2022, which is hereby incorporated by reference herein in its entirety.

What is claimed is:

1. An image forming apparatus, comprising:
an image bearing member configured to rotate;
a charging member configured to contact with the image bearing member and to rotate while forming a charging portion, the charging member charging a surface of the image bearing member at the charging portion;
a charging voltage applying portion configured to apply charging voltage to the charging member;
an exposure unit configured to expose the surface of the image bearing member charged by the charging member;
a developer bearing member configured to bear developer, face the image bearing member at a developing portion, and supply the developer to the surface of the image bearing member;
a developing voltage applying portion configured to apply developing voltage to the developer bearing member;

a transfer member configured to transfer the developer, which has been supplied to the surface of the image bearing member at a transfer portion, onto a transferred member;
a transfer voltage applying portion configured to apply transfer voltage to the transfer member;
a cleaning member configured to contact the image bearing member at a cleaning portion which is formed on a downstream side of the transfer portion and on an upstream side of the charging portion in a rotating direction of the image bearing member; and
a control portion configured to control the charging voltage applying portion, the developing voltage applying portion and the transfer voltage applying portion, wherein
the control portion can execute
a first operation to move the developer from a surface of the charging member to the surface of the image bearing member by controlling the charging voltage applying portion, and
a second operation to supply the developer to the cleaning portion by controlling the charging voltage applying portion, the developing voltage applying portion and the transfer voltage applying portion, wherein
in the first operation, between the charging member and the image bearing member, the control portion controls the charging voltage applying portion so as to generate
a first potential difference that generates an electrostatic force to move developer, which is charged to an opposite polarity to a normal charging polarity, from the charging member to the image bearing member, and
a second potential difference that generates an electrostatic force to move developer, which is charged to the normal charging polarity, from the charging member to the image bearing member, wherein
in the second operation, the control portion controls the charging voltage applying portion, the developing voltage applying portion, and the transfer voltage applying portion, so that
in the developing portion, developer is supplied to the surface of the image bearing member, and
in the transfer portion, the developer is supplied to the cleaning portion by generating an electrostatic force in the developer supplied to the surface of the image bearing member, such that the developer charged to the normal charging polarity moves from the transfer member to the image bearing member, and wherein
a region of the surface of the image bearing member, to which developer is supplied in the second operation, includes a region where the second potential difference has been generated in the first operation immediately before the developer is supplied.

2. An image forming apparatus, comprising:
an image bearing member configured to rotate;
a charging member configured to contact with the image bearing member and to rotate while forming a charging portion, the charging member charging a surface of the image bearing member at the charging portion;
a charging voltage applying portion configured to apply charging voltage to the charging member;
an exposure unit configured to expose the surface of the image bearing member charged by the charging member;

a developer bearing member configured to bear developer, face the image bearing member at a developing portion, and supply the developer to the surface of the image bearing member;

a developing voltage applying portion configured to apply developing voltage to the developer bearing member;

a transfer member configured to transfer the developer, which has been supplied to the surface of the image bearing member at a transfer portion, onto a transferred member;

a transfer voltage applying portion configured to apply transfer voltage to the transfer member;

a cleaning member configured to contact with the image bearing member at a cleaning portion which is formed on a downstream side of the transfer portion and on an upstream side of the charging portion in a rotating direction of the image bearing member; and a control portion configured to control the charging voltage applying portion, the developing voltage applying portion and the transfer voltage applying portion, wherein the control portion can execute a first operation to move the developer from a surface of the charging member to the surface of the image bearing member by controlling the charging voltage applying portion, and a second operation to supply the developer to the cleaning portion by controlling the charging voltage applying portion, the developing voltage applying portion and the transfer voltage applying portion, wherein in the first operation, between the charging member and the image bearing member, the control portion controls the charging voltage applying portion so as to form a first region of the image bearing member where a first potential difference is generated to generate an electrostatic force to move developer, which is charged to an opposite polarity to a normal charging polarity of the developer, from the charging member to the image bearing member, and a second region of the image bearing member where a second potential difference is generated to generate an electrostatic force to move developer, which is charged to the normal charging polarity, from the charging member to the image bearing member, wherein in the second operation, the control portion controls the charging voltage applying portion, the developing voltage applying portion, and the transfer voltage applying portion, so that in the developing portion, developer is supplied to the surface of the image bearing member, and in the transfer portion, the developer is supplied to the cleaning portion by generating an electrostatic force in the developer supplied to the surface of the image bearing member, such that the developer charged to the normal charging polarity moves from the transfer member to the image bearing member, wherein a third region of the surface of the image bearing member, to which developer is supplied in the second operation, includes the second region formed in the first operation.

3. The image forming apparatus according to claim 1, wherein a region where the second potential difference is generated in the first operation, on the surface of the image bearing member, is included in a region to which the developer is supplied in the second operation while the surface of the image bearing member passes through the developing portion first.

4. The image forming apparatus according to claim 1, wherein a region where the second potential difference is generated in the first operation, on the surface of the image bearing member, is formed in plurality, and at least a part of the plurality of regions is included in a region where the developer is supplied in the second operation while the surface of the image bearing member passes through the developing portion first after the second potential difference is generated.

5. The image forming apparatus according to claim 1, wherein the first operation and the second operation are executed in a non-image formation time during which an image is not formed on the transferred member.

6. The image forming apparatus according to claim 1, wherein the respective execution periods of the first operation and the second operation overlap in a certain period.

7. The image forming apparatus according to claim 1, wherein the second operation is executed while the generation of the first potential difference and the generation of the second potential difference are alternately repeated in the first operation.

8. The image forming apparatus according to claim 1, wherein in the first operation, a period for generating the first potential difference and a period for generating the second potential difference are periods in which an entire region of a peripheral surface of the charging member contacts with a peripheral surface of the image bearing member, and each of the period for generating the first potential difference and the period for generating the second potential difference is a period corresponding to one rotation of the charging member.

9. The image forming apparatus according to claim 1, wherein in the first operation, a magnitude of voltage which the charging voltage applying portion applies to the charging member while generating the second potential difference is the same as a magnitude of voltage which the charging voltage applying portion applies to the charging member during image formation that forms an image on the transferred member.

10. The image forming apparatus according to claim 1, wherein in the first operation, the charging voltage applying portion does not apply voltage to the charging member while the first potential difference is generated.

11. The image forming apparatus according to claim 1, wherein in the second operation, developer is supplied to the surface of the image bearing member by the exposure unit forming a latent image by exposing the surface of the image bearing member, and developing the latent image and forming a developer image on the surface of the image bearing member.

12. The image forming apparatus according to claim 11, wherein in a case where a region exposed by the exposure unit in the second operation, on the surface of the image bearing member, reaches the charging portion thereafter, the region is included in a region where the second potential difference in the first operation is generated.

13. The image forming apparatus according to claim 11, wherein a potential difference between a potential of the charging member that generates the second potential difference in the first operation and a surface potential of the image bearing member formed by exposure of the exposure unit in the second operation is a potential difference that generates discharge between the charging member and the image bearing member.

14. The image forming apparatus according to claim 11, wherein applying voltage to the charging member by the charging voltage applying portion to generate the second potential difference in the first operation, and exposure of the image bearing member by the exposure unit in the second operation, are simultaneously performed in a certain period at least temporarily.

15. The image forming apparatus according to claim 1, wherein applying voltage to the charging member by the charging voltage applying portion to generate the second potential difference in the first operation, and applying voltage to the transfer member by the transfer voltage applying portion to generate an electrostatic force to move developer charged to the normal charging polarity from the transfer member to the image bearing member in the second operation, are simultaneously performed in a certain period at least temporarily.

16. The image forming apparatus according to claim 1, wherein in order to generate the second potential difference, a polarity of voltage which the charging voltage applying portion applies to the charging member is a negative polarity, and wherein in order to generate an electrostatic force to move developer charged to the normal charging polarity from the transfer member to the image bearing member, a polarity of voltage which the transfer voltage applying portion applies to the transfer member is a negative polarity.

17. The image forming apparatus according to claim 1, wherein the transfer voltage applying portion includes:

a positive voltage applying portion configured to apply voltage of a positive polarity to the transfer member; and a negative voltage applying portion configured to apply voltage of a negative polarity to the transfer member; wherein the charging voltage applying portion and the negative voltage applying portion have in common a power supply, and are configured such that applying voltage to either one of the charging voltage applying portion and the negative voltage applying portion applies voltage to the other one of the charging voltage applying portion and the negative voltage applying portion, wherein the transfer voltage applying portion is configured such that, in a case where applying voltage by the positive voltage applying portion and applying voltage by the negative voltage applying portion overlap, voltage of positive polarity is applied to the transfer member.

18. The image forming apparatus according to claim 1, wherein the developer includes toner of which normal charging polarity is negative polarity, and external additives which are added to the toner and of which normal charging polarity is positive polarity.

* * * * *